Aug. 21, 1951 — B. E. BROWN — 2,564,876
MOWER
Filed April 23, 1947 — 2 Sheets-Sheet 2
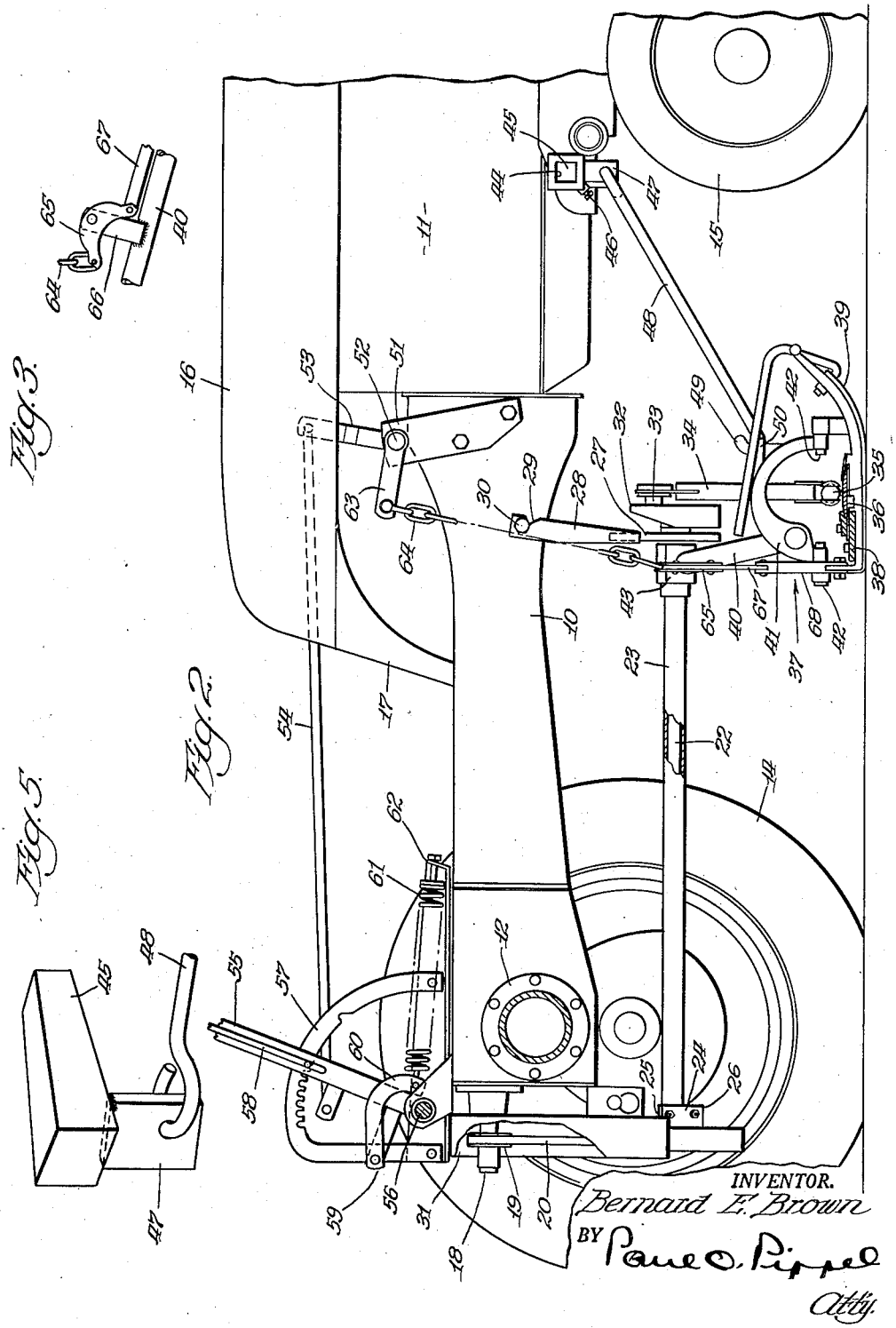
INVENTOR.
Bernard E. Brown
BY Paul O. Pippel
Atty.

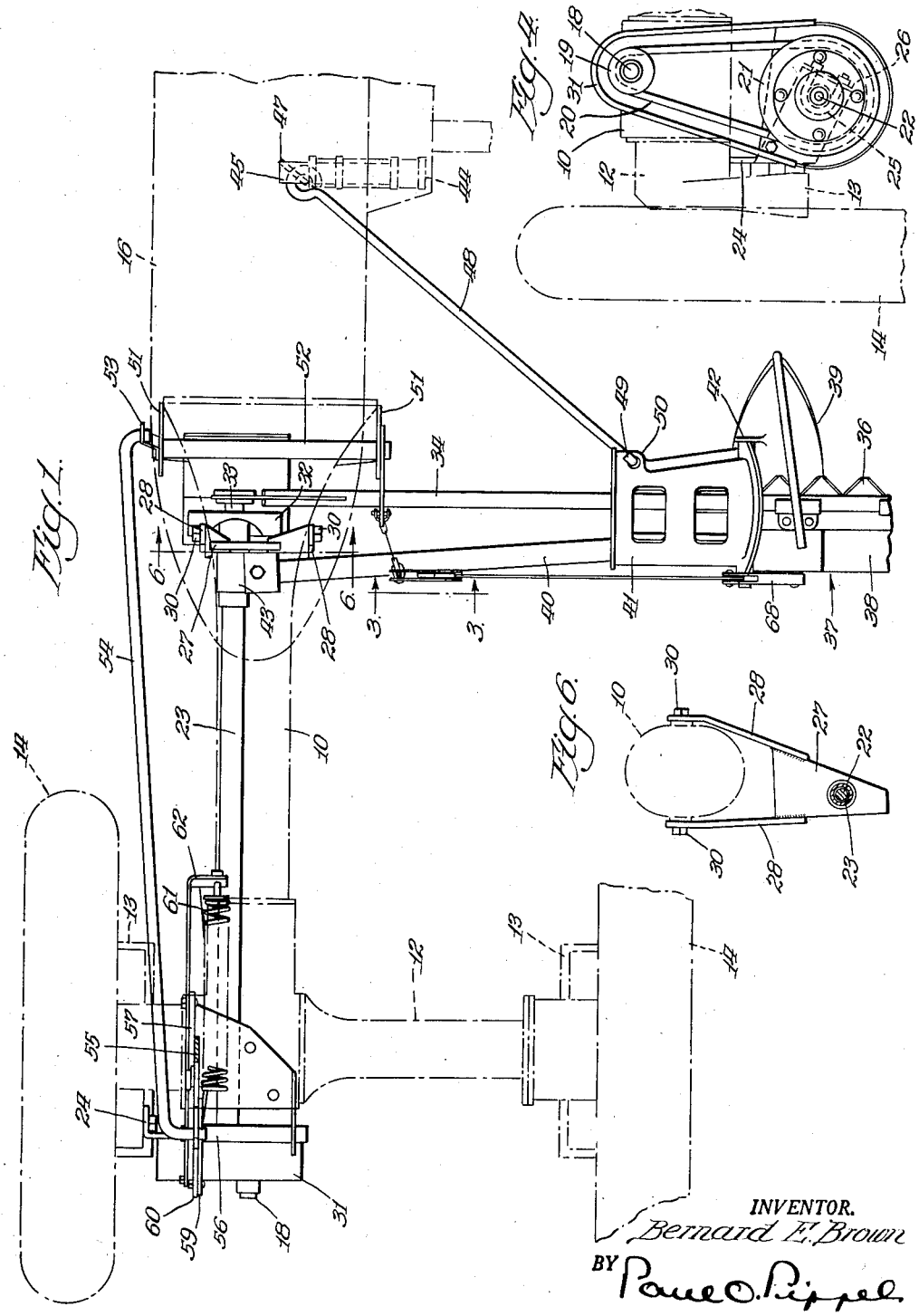

Patented Aug. 21, 1951

2,564,876

UNITED STATES PATENT OFFICE 2,564,876

MOWER

Bernard E. Brown, Chicago, Ill., assignor to International Harvester Company, a corporation of New Jersey Application April 23, 1947, Serial No. 743,271

7 Claims. (Cl. 56—25)

This invention relates to an agricultural implement and more particularly to a tractor mower.

The invention contemplates and has for a principal object the provision of an improved tractor mower of the type in which the mower includes a frame carried midway between the front and rear wheels of the tractor, and has a cutter bar extending laterally to one side thereof. Another object of the invention is to provide an improved mower construction that may be easily attached to and detached from a tractor. Still another object of the invention is to provide an improved light-weight mower construction primarily adapted for use with a small tractor.

The foregoing and other desirable objects and features of the invention will appear as the disclosure is more fully made in the following detailed description and accompanying sheets of drawings, in which:

Fig. 1 is a plan view of the mower shown in attached position with respect to a tractor, the tractor being illustrated in broken lines;

Fig. 2 is a side elevation of the structure shown in Fig. 1, the tractor being illustrated in full lines, the right wheel removed and the axle being shown in section;

Fig. 3 is an enlarged fragmentary view taken on the line 3—3 of Fig. 1 and illustrating a portion of the mechanism for raising and lowering the cutting mechanism of the mower;

Fig. 4 is a fragmentary rear elevational view showing part of the drive means for the mower;

Fig. 5 is an enlarged perspective view showing part of the means by which the mower is attached to the tractor; and Fig. 6 is a transverse sectional view taken substantially on the line 6—6 of Fig. 1 and showing another part of the means by which the mower is attached to the tractor.

The tractor chosen for the purpose of illustration comprises a relatively narrow longitudinal body 10 including a power plant 11 at its forward end, and a rear axle structure 12 at its rear end. The axle structure includes at opposite sides thereof depending gear housings 13, each of which includes a stub axle (not shown) on which is carried a traction wheel 14. The forward end of the body 10 is carried on a steerable wheel structure including front wheels 15. The power plant 11 is covered at its top by a longitudinally extending hood structure 16 supported at its rear end by means of a bracket 17 mounted on an intermediate portion of the body 10.

The rear end of the tractor body is provided with a longitudinally rearwardly extending power shaft 18, which shaft may be driven in the usual manner from the power plant 11. This shaft has keyed thereto for rotation therewith a drive pulley 19, which, by means of a drive belt 20, drives a larger pulley 21 carried on the rear end of a longitudinally forwardly extending drive shaft 22. The shaft 22 is contained within and journaled in a longitudinally extending tube 23. This tube is supported at its rear end by means of a mounting bracket 24 rigidly secured to the left hand depending gear housing 13. The tube is mounted in the bracket 24 by means of a U-bolt 25 and a cap 26 (Fig. 4). The forward end of the tube 23 is rigidly carried in a vertical substantially triangular plate 27 (Fig. 6) at each of the opposite sides of which is secured an upwardly extending supporting member 28. Each member 28 is notched at its upper end at 29 to receive a cap screw 30 which is threaded into an appropriate tapped bore in the side of the longitudinal body 10 of the tractor. The supporting members 28, together with the plate 27 and tube 23, may be easily removed from the body 10 upon loosening of the cap screws 30.

The pulleys 19 and 21 and drive belt 20 are appropriately shielded by shield structure 31.

The shaft 22 extends at its forward end forwardly of the forward end of the tube 23 and has keyed thereto for rotation therewith a fly wheel 32. The fly wheel is provided with a crank 33 to which is connected one end of a transversely extending pitman 34. The outer end of the pitman is connected at 35 to the knife head of a reciprocating knife 36 forming part of a mower cutting mechanism indicated generally by the numeral 37. The cutting mechanism further includes a laterally extending cutter bar 38—in which the knife 36 is mounted—an inner shoe 39, a transverse coupling bar 40, and a yoke 41. The yoke 41 is rigidly secured to the coupling bar 40, as is conventional, and is pivotally connected on a transverse axis as at 42 to the inner shoe 39. The inner end of the coupling bar 40 includes a bearing 43 which embraces a forward portion of the tube 23 just rearwardly of plate 27. The cutting mechanism is thus mounted on the tube 23 for vertical movement about the longitudinal axis of the tube.

The forward portion of the tractor body includes at a point below the power plant 11 and just rearwardly of the front wheels 15, bracket means including a socket element 44 by means of which various types of implements may be connected to the tractor. In the present instance, the socket element 44 receives therein an elongated bar or mounting member 45 which is square in cross section to be received by the square socket 44. The socket structure includes a pair of cap screws 46 (only one of which is shown in Fig. 2). When the bar 45 is in place as shown in Figs. 1 and 2 the cap screws are tightened to connect the parts rigidly together. The bar 45 includes at its outer end a depending ear 47 apertured to receive the forward hooked end of a rearwardly and diagonally extending brace member 48 (Fig. 5), the rear end of which is provided with a hook 49 that is received by an ear 50 on the yoke 41. The ear 47 is welded or otherwise rigidly secured to the bar 45.

For the purpose of raising and lowering the cutting mechanism 37 about its axis of connection to the tube 23, the mower is equipped with lifting and lowering mechanism. An intermediate portion of the body 10 of the tractor, just rearwardly of the power plant 11, is provided with a pair of transversely spaced upright brackets 51. These brackets serve to carry rockably therein a transverse rock shaft 52. The left hand end of the rock shaft has rigidly connected thereto an upstanding lever arm 53, the upper end of which is connected to a longitudinally extending rod 54. The rear end of the rod is connected to a lifting lever 55 carried on a transverse rock shaft 56 positioned at the rear of the tractor body. A notched quadrant 57 is associated with detent mechanism 58 on the lever 55 and determines various positions of adjustment of the lever. The lower end of the lever has rigidly secured thereto a rearwardly extending arm 59, to the rear end of which is connected a forwardly and downwardly curved link 60. A counter-balancing spring 61 is connected at one end to the link 60 and at its other end to a bracket 62 rigidly mounted on the tractor body 10.

The right hand end of the rock shaft 52 has rigidly secured thereto a rearwardly and substantially horizontally extending arm 63. This arm is connected to the upper end of a lifting chain 64. The lower end of the chain is connected to a bell crank 65 (Fig. 3) carried on a bracket 66 rigidly mounted on an intermediate portion of the coupling bar 40. The other arm of the bell crank 65 is connected by means of a link 67 to gag lever means 68 mounted on the yoke 41 and connected to the inner shoe 39. The gag lever mechanism may be of any conventional type and is not shown herein in detail. It will be seen that rocking of the lever 55 on the tractor in a forward direction rocks the rock shaft 52 and consequently moves the arm 63 in a clockwise direction to draw upwardly on the lifting chain 64. This motion in turn results in rocking of the bell crank 65 so that the cutter bar 38 and inner shoe 39 are pivoted with respect to the yoke 41 about the pivots 42. Similarly, when the lever 55 is moved rearwardly the cutter bar will be lowered.

It will be noted from the structure set forth that the mower may be readily detached from the tractor. It is necessary only that the brackets 24 and 27 be disconnected and that the bar 45 be removed from the socket structure 44. Since the lifting structure including the lever 55, rod 54, and rock shaft 52 may be useful in connection with other implements, it is ordinarily not necessary to remove these parts. The mower may be disconnected from the structure just referred to by means of disconnecting the chain 64.

The entire mower structure is light-weight and simple in design and operation, consisting as it does merely of the tube 23 and cutting mechanism 37. The tube 23, in addition to supporting the mower, serves also as means for containing and journaling the drive shaft 22. Other features of the invention will readily occur to those skilled in the art. It is not desired, however, that the invention be limited by the exact details set forth, for numerous modifications and alterations may be made in the preferred structure illustrated and described without departing from the spirit and scope of the invention as set forth in the appended claims.

What is claimed is:

1. For a tractor of the type having a relatively narrow longitudinal body carried on front wheels and on a rear axle structure including depending housings and wheels and provided at the rear end of the body with a longitudinally rearwardly extending power take-off shaft and at the front end of the body with means including a socket for the attachment of implements: a mower attachment comprising a single longitudinal tube below and paralleling the tractor body and extending from substantially the rear of the body to a point substantially midway between the front and rear wheels; bracket means for removably connecting the rear end of the tube to a depending housing; bracket means for removably rigidly connecting and supporting the front end of the tube to the tractor body and including a plate carrying the tube and a pair of upstanding supports extending respectively at opposite sides of the body; a mower frame member extending laterally outwardly from the tube to one side of the tractor ahead of one rear wheel; means pivoting the inner end of the frame member on the tube; cutting mechanism pivotally mounted at the outer end of the frame member; a shaft journaled in the tube and extending at its opposite ends from opposite ends of the tube; drive means connecting the rear end of the shaft to the power take-off shaft; drive means connecting the front end of the shaft to the cutting mechanism; a brace connected at one end to the frame member; and means connecting the other end of the brace to the tractor, including an element receivable in the aforesaid socket means.

2. For a tractor of the type having a relatively narrow longitudinal body carried on front and rear wheels and provided at the rear end of the body with a longitudinally rearwardly extending power take-off shaft and at the front end of the body with means including a socket for the attachment of implements: a mower attachment comprising a longitudinal tube below and paralleling the tractor body and extending from substantially the rear of the body to a point substantially midway between the front and rear wheels; bracket means for removably rigidly connecting the rear end of the tube to a rear portion of the tractor body; bracket means for removably connecting and supporting the front end of the tube to the tractor body and including a plate carrying the tube and a pair of upstanding supports extending respectively at opposite sides of the body; a mower frame member extending laterally outwardly from the tube to one side of the tractor ahead of one rear wheel; means pivoting the inner end of the frame member on the tube; cutting mechanism pivotally mounted at the outer end of the frame member; a shaft journaled in the tube and extending at its opposite ends from opposite ends of the tube; drive means connecting the rear end of the shaft to the power take-off shaft; drive means connecting the front end of the shaft to the cutting mechanism; a brace connected at one end to the frame member; and means connecting the other end of the brace to the tractor, including an element receivable in the aforesaid socket means.

3. For a tractor of the type having a relatively narrow longitudinal body carried on front wheels and on a rear axle structure including depending housings and wheels provided at one end of the body with a power take-off shaft and at the other end of the body with means including a socket for the attachment of implements: a mower attachment comprising a single longitudinal tube below and paralleling the tractor body; bracket means for removably connecting the rear end of the tube to a depending housing; bracket means for removably rigidly connecting and supporting the front end of the tube to the tractor body and including a plate carrying the tube and a pair of upstanding supports extending respectively at opposite sides of the body; a mower frame member extending laterally outwardly from the tube to one side of the tractor ahead of one rear wheel; means pivoting the inner end of the frame member on the tube; cutting mechanism pivotally mounted at the outer end of the frame member; a shaft journaled in the tube and extending at its opposite ends from opposite ends of the tube; drive means connecting the rear end of the shaft to the power take-off shaft; drive means connecting the front end of the shaft to the cutting mechanism; a brace connected at one end to the frame member; and means connecting the other end of the brace to the tractor, including an element receivable in the aforesaid socket means.

4. For a tractor of the type having a relatively narrow longitudinal body carried on front and rear wheels and provided at the rear end of the body with a longitudinally rearwardly extending power take-off shaft and at the front end of the body with means including a socket for the attachment of implements; a mower attachment comprising a longitudinal tube below and paralleling the tractor body and extending from substantially the rear of the body to a point substantially midway between the front and rear wheels; bracket means for removably connecting the rear end of the tube to a rear portion of the tractor body; bracket means for removably rigidly connecting and supporting the front end of the tube to an intermediate portion of the tractor body; a mower frame member extending laterally outwardly from the tube to one side of the tractor ahead of one rear wheel; means pivoting the inner end of the frame member on the tube; cutting mechanism pivotally mounted at the outer end of the frame member; a shaft journaled in the tube and extending at its opposite ends from opposite ends of the tube; drive means connecting the rear end of the shaft to the power takeoff shaft; drive means connecting the front end of the shaft to the cutting mechanism; a brace connected at one end to the frame member; and means connecting the other end of the brace to the tractor, including an element receivable in the aforesaid socket means.

5. For a tractor of the type having a relatively narrow longitudinal body carried on front wheels and on a rear axle structure including depending housings and wheels and provided at one end of the body with a power take-off shaft and at the other end of the body with means including a socket for the attachment of implements: a mower attachment comprising a single longitudinal tube below and paralleling the tractor body; bracket means for removably connecting the rear end of the tube to a depending housing; bracket means for removably rigidly connecting and supporting the front end of the tube to an intermediate portion of the tractor body; a mower frame member extending laterally outwardly from the tube to one side of the tractor ahead of one rear wheel; means pivoting the inner end of the frame member on the tube; cutting mechanism pivotally mounted at the outer end of the frame member; a shaft journaled in the tube and extending at its opposite ends from opposite ends of the tube; drive means connecting the rear end of the shaft to the power take-off shaft; drive means connecting the front end of the shaft to the cutting mechanism; a brace connected at one end to the frame member; and means connecting the other end of the brace to the tractor, including an element receivable in the aforesaid socket means.

6. For a tractor of the type having a longitudinal body carried on front and rear wheels and including at its front end means providing a socket for the attachment of implements: an implement attachment comprising supporting structure, said structure including a tubular member; means connecting the supporting structure directly and rigidly to the underside of the tractor body along a longitudinal axis; frame means connected to the supporting structure and extending laterally of the tractor; and brace means extending generally diagonally between the frame means and the aforesaid socket means and connected at one end to the frame means and at its other end to the socket means.

7. For a tractor of the type having a longitudinal body carried on front and rear wheels and including at one end means providing a socket for the attachment of implements: an implement attachment comprising supporting structure, said structure including a tubular member; means connecting the supporting structure directly and rigidly to the underside of the tractor body along a longitudinal axis; frame means connected to the supporting structure and extending laterally of the tractor; and brace means extending generally diagonally between the frame means and the aforesaid socket means and connected at one end to the frame means and at its other end to the socket means.

BERNARD E. BROWN.

REFERENCES CITED

The following references are of record in the file of this patent:

UNITED STATES PATENTS

| Number | Name | Date |
|---|---|---|
| 1,758,527 | Maine | May 13, 1930 |
| 1,855,838 | Kranick | Apr. 26, 1932 |
| 2,245,451 | Simpson | June 10, 1941 |